US011869736B2

(12) United States Patent
Gottschalk et al.

(10) Patent No.: US 11,869,736 B2
(45) Date of Patent: Jan. 9, 2024

(54) CIRCUIT INTERRUPTER WITH BRAKE SYSTEM FOR SHAFT THAT OPENS SEPARABLE CONTACTS

(71) Applicant: EATON INTELLIGENT POWER LIMITED, Dublin (IE)

(72) Inventors: Andrew L. Gottschalk, Monaca, PA (US); Robert Michael Slepian, Murrysville, PA (US); Xin Zhou, Franklin Park, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 69 days.

(21) Appl. No.: 17/564,453

(22) Filed: Dec. 29, 2021

(65) Prior Publication Data

US 2023/0207245 A1 Jun. 29, 2023

(51) Int. Cl.
*H01H 75/04* (2006.01)
*H01H 71/66* (2006.01)

(52) U.S. Cl.
CPC ............ *H01H 75/04* (2013.01); *H01H 71/66* (2013.01); *H01H 2071/665* (2013.01)

(58) Field of Classification Search
CPC ........ H01H 50/44; H01H 50/18; H01H 50/54; H01H 50/64; H01H 50/42; H01H 50/20; H01H 50/62; H01H 50/641; H01H 50/023; H01H 50/643; H01H 50/646; H01H 36/00
See application file for complete search history.

(56) References Cited

U.S. PATENT DOCUMENTS

| | | | | |
|---|---|---|---|---|
| 4,612,429 | A | 9/1986 | Milianowicz | |
| 10,923,304 | B1 | 2/2021 | Juds | |
| 2015/0235784 | A1 | 8/2015 | Karlstrom | |
| 2020/0111631 | A1 * | 4/2020 | Hanna | H01H 33/14 |
| 2020/0279709 | A1 | 9/2020 | Chen | |
| 2021/0151265 | A1 * | 5/2021 | Sullivan | H01H 50/023 |

OTHER PUBLICATIONS

European Patent Office, “International Search Report and Written Opinion” for corresponding International (PCT) Patent Application No. PCT/EP2022/025585, dated Mar. 20, 2023, 16 pp.

* cited by examiner

*Primary Examiner* — Bryan R Perez
(74) *Attorney, Agent, or Firm* — Eckert Seamans Cherin & Mellott, LLC

(57) ABSTRACT

A circuit interrupter includes a frame, a set of separable contacts that can be generally stated as including a stationary contact and a movable contact, the stationary contact being affixed to the frame, a shaft movably situated on the frame, the movable contact being situated on the shaft, a drive system situated on the frame and operable to move the shaft with respect to the frame between a first position and a second position, the set of separable contact being a CLOSED state in the first position of the shaft and being in an OPEN state in the second position of the shaft, and a brake that can be generally stated as including a mass movably situated on the frame, the shaft being structured to engage the mass and to cause the mass to be in motion when moving from the first position toward the second position.

8 Claims, 8 Drawing Sheets

CIRCUIT INTERRUPTER WITH BRAKE SYSTEM FOR SHAFT THAT OPENS SEPARABLE CONTACTS

BACKGROUND

Field

The disclosed concept relates generally to a circuit interrupter and, more particularly, to a circuit interrupter having a drive system having multiple actuators that move a shaft at multiple speeds plus a brake having devices that are capable of managing the shaft at the multiple speeds.

Related Art

It is known to employ circuit interrupters of various types. It is also known, however, that employing highly powerful devices to separate a set of separable contacts can be difficult to accomplish since the speed at which the set of separable contacts are separated can be difficult to dissipate. Thus, there is room for improvement in circuit interrupters, such as those that employ highly powerful devices that employed to open a set of separable contacts.

SUMMARY

These needs and others are met by embodiments of the invention, which are directed to an improved circuit interrupter.

As one aspect of the disclosed and claimed concept, a circuit interrupter can be generally stated as including a frame, a set of separable contacts that can be generally stated as including a stationary contact and a movable contact, the stationary contact being affixed to the frame, a shaft movably situated on the frame, the movable contact being situated on the shaft, a drive system situated on the frame and operable to move the shaft with respect to the frame between a first position and a second position, the set of separable contact being a CLOSED state in the first position of the shaft and being in an OPEN state in the second position of the shaft, and a brake that can be generally stated as including a mass movably situated on the frame, the shaft being structured to engage the mass and to cause the mass to be in motion when moving from the first position toward the second position.

BRIEF DESCRIPTION OF THE DRAWINGS

A full understanding of the disclosed concept can be gained from the following Description when read in conjunction with the accompanying drawings in which.

DESCRIPTION

Figure 1:
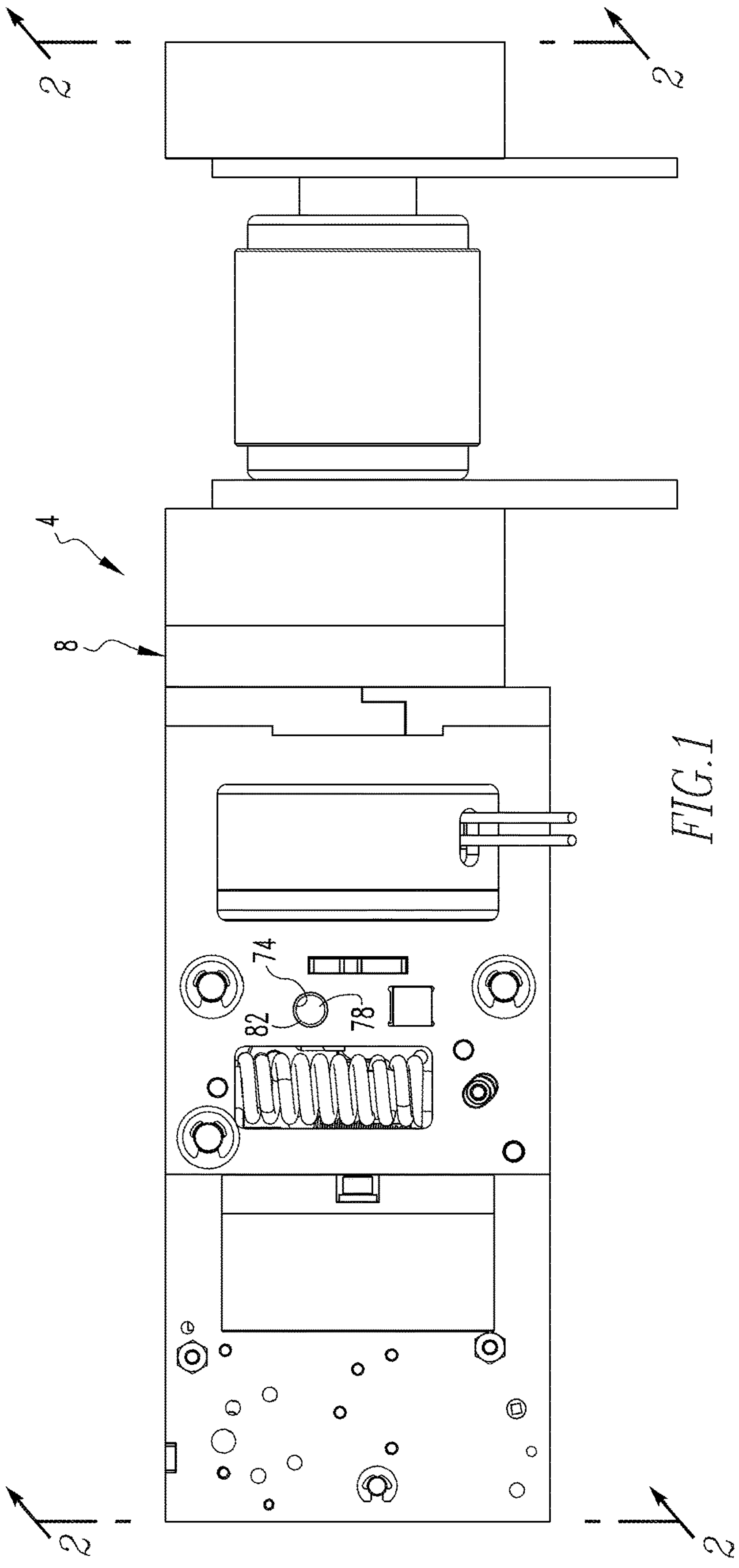
FIG. 1 is a side view of an improved circuit interrupter in accordance with a first embodiment of the disclosed and claimed concept.

An improved circuit interrupter 4 in accordance with a first embodiment of the disclosed and claimed concept is depicted generally in FIG. 1 and is depicted in part in FIGS. 2-6. The circuit interrupter 4 can be stated as including a frame 8 and further includes a set of separable contacts 12 that are situated in the frame 8 and which include a stationary contact 16 and a movable contact 20. The circuit interrupter 4 further includes a shaft 24 that is movably situated on the frame 8 and upon which the movable contact 20 is situated. The circuit interrupter 4 further includes a drive system 28 and a brake 32 that are likewise situated on the frame 8.

Figure 2:
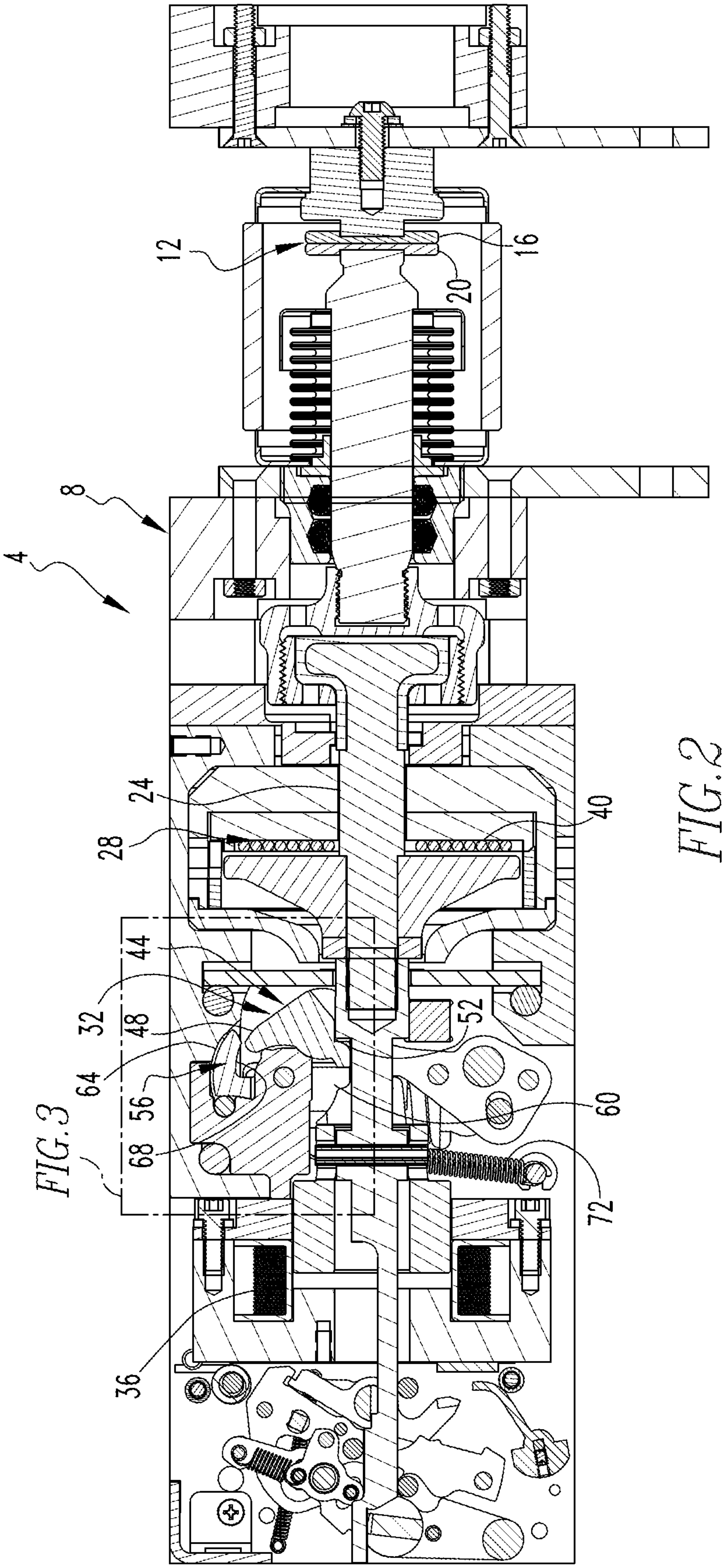
FIG. 2 is a sectional view as taken along line 2-2 of FIG. 1 and depicts a shaft of the circuit interrupter in a first position where a set of separable contacts are in a CLOSED state.
Figure 3:
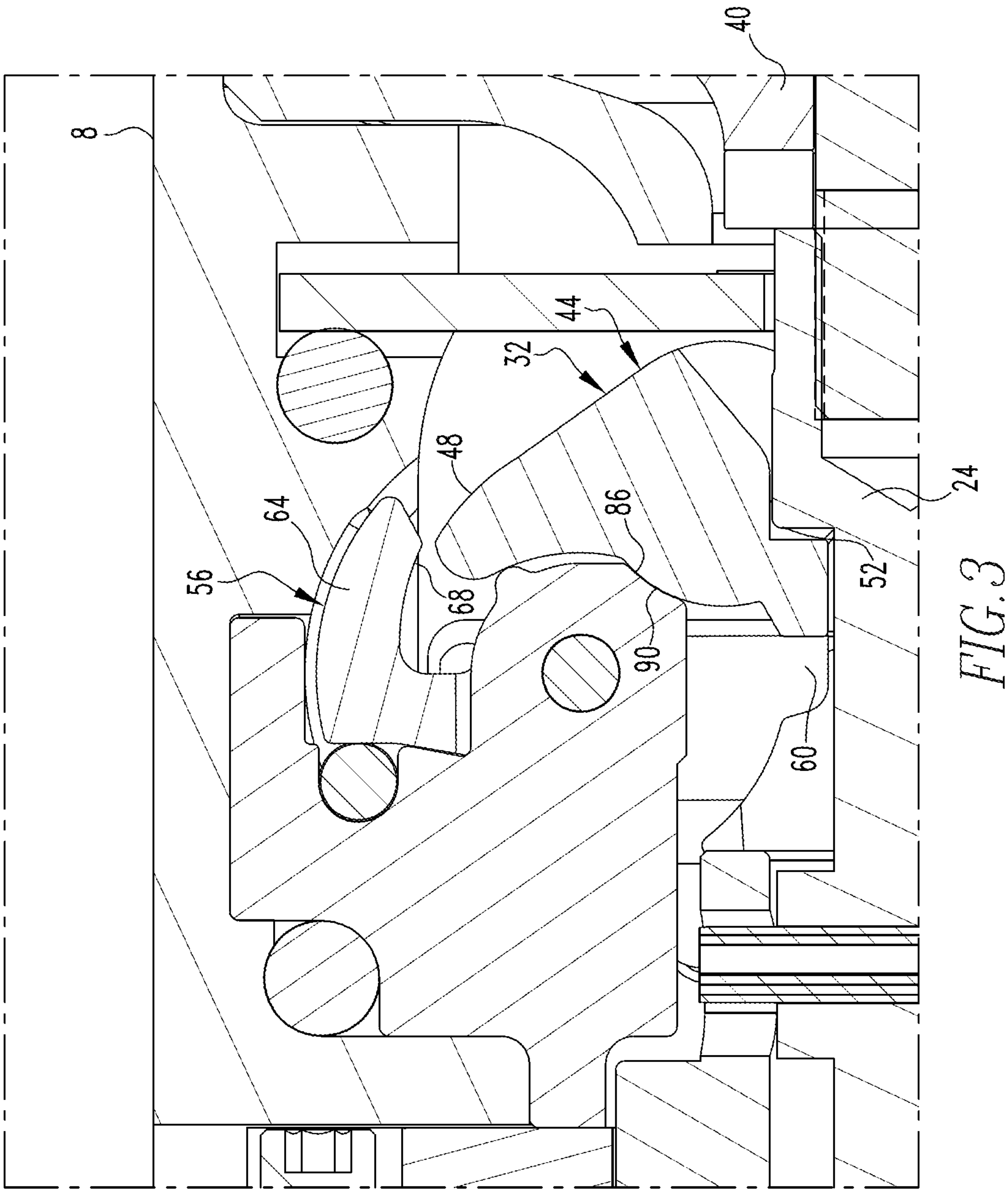
FIG. 3 is an enlargement of portion indicated in FIG. 2.
Figure 4:
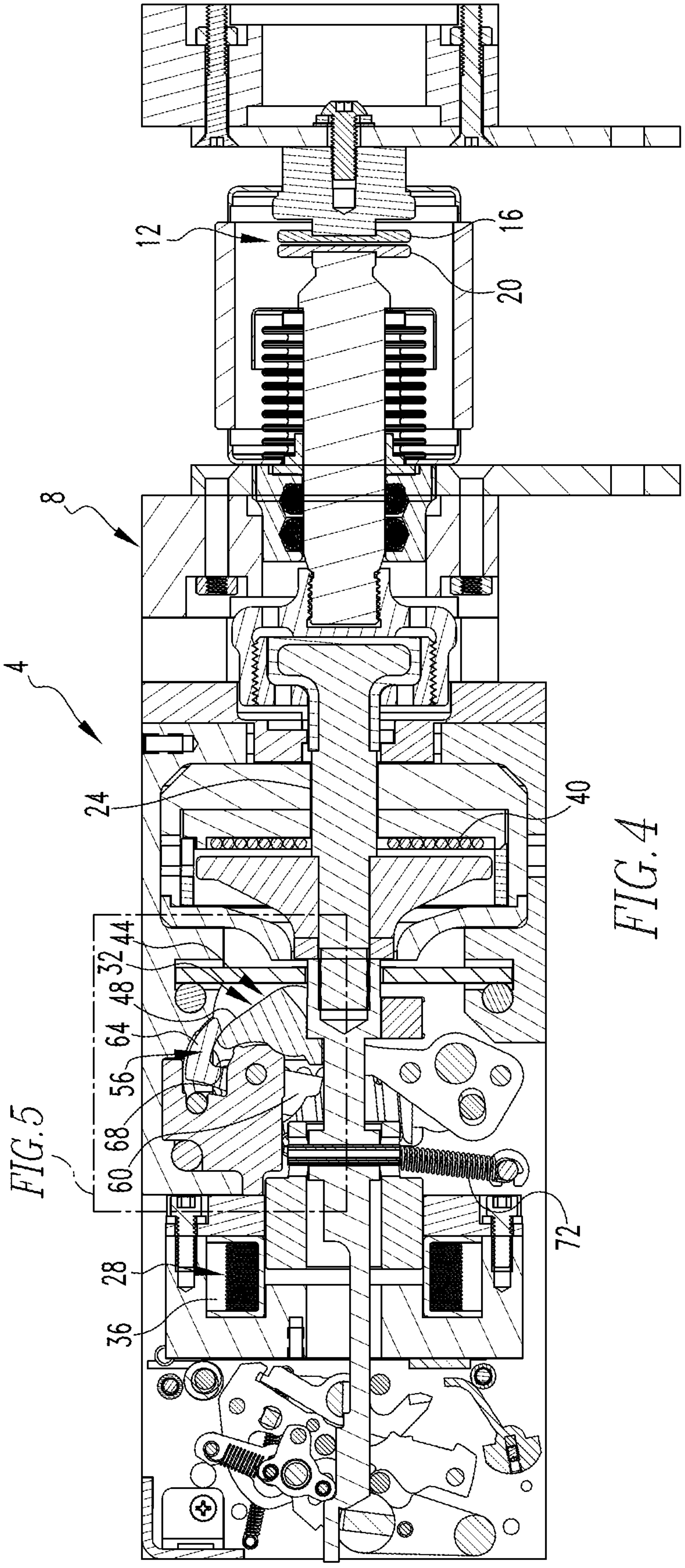
FIG. 4 is a view similar to FIG. 2 except depicting the set of separable contacts in an OPEN state and depicting the shaft in a predetermined position as having initially engaged a brake of the circuit interrupter.
Figure 5:
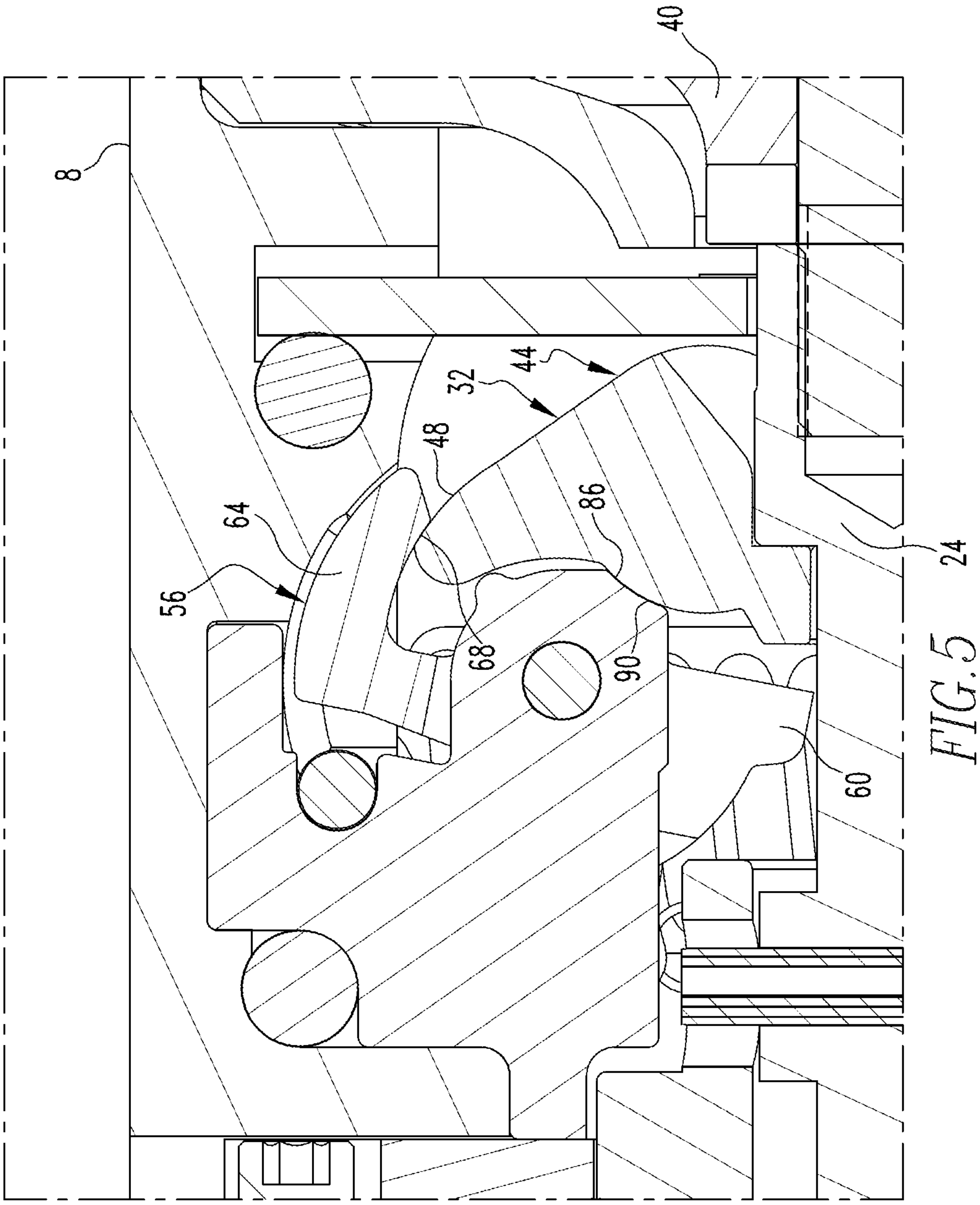
FIG. 5 is an enlargement of portion indicated in FIG. 4.
Figure 6:
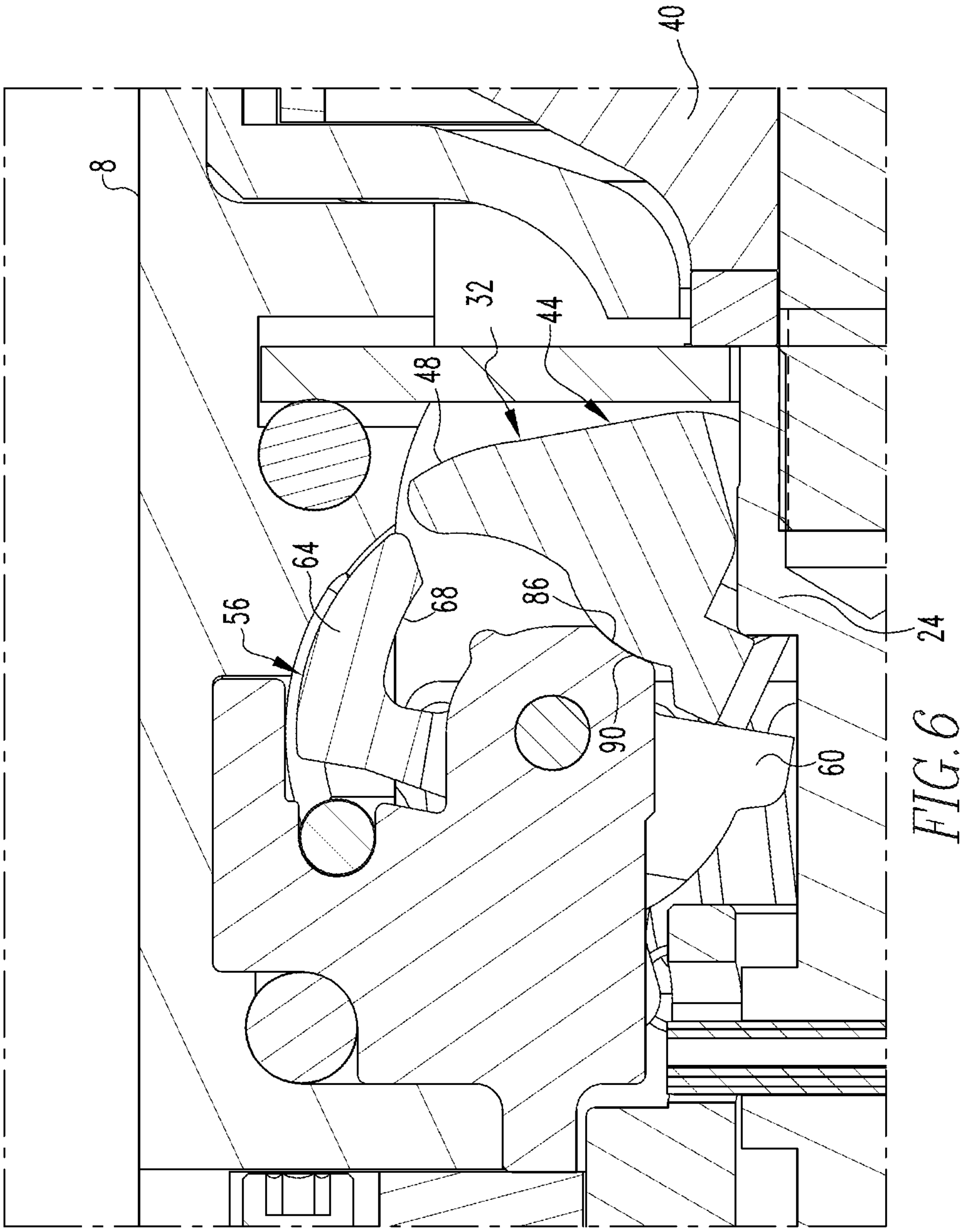
FIG. 6 is a view similar to FIG. 5, except depicting the shaft as being in a second position and wherein portions of the brake that were engaged in FIG. 5 are disengaged.

The shaft 24 can be stated to be movable between a first position such as is depicted in FIGS. 1-3 wherein the set of separable contacts 12 are in their CLOSED state and an opposite second position that is depicted generally in FIG. 6 wherein the set of separable contacts 12 are in their OPEN state. Furthermore, in the shaft 24 moving from the first position to the second position as a result of operation of the drive system 28, the shaft 24 reaches and moves through a predetermined position that is depicted generally in FIGS. 4-5 wherein the set of separable contacts 12 are in their OPEN state but at the point where the shaft 24 potentially needs to begin to be braked by the brake 32 in order to be able to come to a complete stop at the second position.

In particular, it is noted that the drive system 28 includes both a first actuator 36 and a second actuator 40 that are separately operable in different conditions of the circuit interrupter 4 to move the shaft 24 from the first position to the second position. More particularly, the first actuator 36 is a solenoid and typically is operated when an operator chooses to move the circuit interrupter 4 from the ON condition to the OFF condition, by way of example. However, the second actuator 40 is, for example, a Thomson coil which is operated in response to a tripping event or other situation wherein a rapid opening of the set of separable contacts 12 is required. When the first actuator 36 is operated, the shaft 24 is moved from the first position toward the second position at a first velocity. However, when the second actuator 40 is operated, the shaft 24 is moved from the first position toward the second position at a second velocity that is vastly in excess of the first velocity. As such, when the second actuator 40 is operated, the brake 32 is advantageously operated in order to sufficiently reduce the velocity of the shaft 24 in order to avoid damage to the circuit interrupter 4.

The brake 32 of the circuit interrupter 4 can be stated to include a mass 44 that is pivotably situated on the frame 8 and which includes an arcuate surface 48. In the depicted exemplary embodiment, the mass 44 is a pivotable transfer shaft, although other structures having mass potentially could be employed, it being understood that the rotational aspect of the pivotable transfer shaft causes the mass to result in the pivotable transfer shaft having inertia as well. When the shaft 24 is in its first position, a space 52 that is best shown in FIG. 3 exists between the shaft 24 and the mass 44. When the shaft 24 is moved from its first position toward its second position, it moves in a leftward direction from the perspective of FIG. 3 and actually moves across the space 52 and reaches contact with the mass 44 in what is referred to herein as the predetermined position, such as is depicted generally in FIG. 5.

As can be understood from FIGS. 5 and 6, engagement of the shaft 24 with the mass 44 causes the mass 44 to pivot in a clockwise direction from the perspective of FIGS. 5, for instance. Such pivoting of the mass 44 occurs regardless of the velocity of the shaft 24 from either the first actuator 36 for the second actuator 40.

It is noted, however, that the brake 32 further includes another mass 56 that is likewise pivotably situated on the frame 8 and which is biased by a spring 72 toward an initial position, such as is depicted generally in FIG. 3, wherein the another mass 56 is situated prior to the mass 44 engaging the another mass 56. More particularly, the another mass 56 includes a first portion 60 that is engaged by the mass 44 when the shaft 24 moves from its first position to its second position and causes pivoting of the mass 44. When the drive 32 operates the first actuator 36 which moves the shaft 24 toward the second position at the relatively slower first velocity, the quantity of mass of the mass 44 tends to reduce the velocity of the shaft 24 due to engagement therebetween. Pivoting of the mass 44 in the clockwise direction lightly engages the first portion 60 of the another mass 56 and slightly moves the another mass 56 in a likewise clockwise direction against the bias of the spring 72. The spring 72 ultimately returns the another mass 56 back to its position that is depicted generally in FIG. 3. In the depicted exemplary embodiment, the another mass 56 is a pivotable rolling block, although other structures having mass potentially could be employed, it being understood that the rotational aspect of the pivotable rolling block causes the mass to result in the pivotable rolling block having inertia as well.

However, when the drive system 28 operates the second actuator 40 move the shaft 24 from its first position to its second position at the much greater second velocity, it far more rapidly engages the mass 44, and the quantity of mass contained by the mass 44 is rapidly pivoted by the engagement by the shaft 24. Such rapid pivoting movement of the mass 44 resultantly engages the first portion 60 of the another mass 56 at a relatively much greater velocity than when the shaft 24 is moved at the relatively slower first velocity. The result of a much greater velocity engagement of the mass 44 with the another mass 56 causes the another mass 56 to pivot in the clockwise direction at a relatively much greater velocity. In this regard, the another mass 56 further includes a second portion 64 having another arcuate surface 68 that physically collides with the arcuate surface 48 of the mass. The orientation of the arcuate surface 48 and the another arcuate surface 68 with respect to one another causes alignment-based repulsion of the another mass 56 back toward its initial position as a result of bouncing of the another mass 56 away from the mass 44. Such movement of the another mass 56 is as a result of both the bias of the spring 72 and the orientation of the arcuate surface 48 and the another arcuate surface 68 with respect to one another.

It thus can be understood that pivoting movement of both the mass 44 and the another mass 56 as a result of the impact by the shaft 24 advantageously reduces the velocity of the shaft 24 to a velocity comparable to the first velocity, which the circuit interrupter 4 can handle without damage thereto. It is also understood that when the mass 44 and the another mass 56 pivot in the counter-clockwise direction back to their initial positions, such as the positions depicted generally in FIG. 3, these structures will bounce into one another and into other structures of the frame 8 in a fashion that dissipates energy in an acoustic fashion and in other fashions, such that the momentum and energy of the shaft 24 moving at the second velocity that had initially been transferred to the first and second masses 44 and 56 are advantageously dissipated.

It is further noted that the frame 8 includes a number of openings 74, such as are depicted generally in FIG. 1, and that the mass 44 includes a number of hubs 78 that are pivotably situated within the opening 74 and which permit the mass 44 to pivot between the positions that are depicted generally in FIGS. 5 and 6, by way of example. It is expressly noted that a clearance 82 exists between the number of openings 74 and the number of hubs 78 which may be on the order 0.010-0.015 inches. As such, it is understood that the clearance 82 permits a certain amount of radial movement of the number of hubs 78 and thus the mass 44 in a radial direction with respect to the openings 74, which can be movement of the mass 44 with respect to the frame 8 that is additional to the aforementioned pivotal movement of the mass 44 with respect to the frame 8.

In this regard, it is noted that the frame 8 includes a number of support arcuate surfaces 86 that are depicted generally in FIGS. 3, 5, and 6 and which are formed on a number of support plates situated on the frame. It is noted that the number of support plates of the frame 8 support the mass 44 and act as a bearing point in the middle to stop the mass 44 from deflecting under the load that is applied by the shaft 24 during a fast opening from second actuator 40, i.e., the Thomson coil. This is the reason the hubs 78 on the ends of the mass 44 are loose due to the spacing between the number of openings 74 and the number of hubs 78 as noted elsewhere herein.

It is further noted that the mass 44 includes a number of mass arcuate surfaces 90. These can be considered to be components of the brake 32. As a result of the aforementioned radial movement of the mass 44 with respect to the frame 8, the number of mass arcuate surfaces 90 can be caused to engage the number of support arcuate surfaces 86. Such engagement therebetween can result in the pivoting movement of the mass 44 with respect to the frame 82 to become frictional and to dissipate further energy of the mass 44 that has been transferred thereto from movement of the shaft 24. This further advantageously dissipates the energy of the shaft 24 and thus results in dissipation of the energy of the mass 44. This is highly desirable in the instance of actuation of the second actuator 40 to move the set of separable contacts 12 to their OPEN state. It thus can be understood that the various components of the brake 32 that dissipate energy and slow the shaft 24 when it is translated at the second velocity as a result of operation of the second actuator 40 advantageously slow the shaft 24 basically to the first velocity. This advantageously permits other components of the frame 82 to stop the movement of the shaft 24 at its second position.

Figure 7:
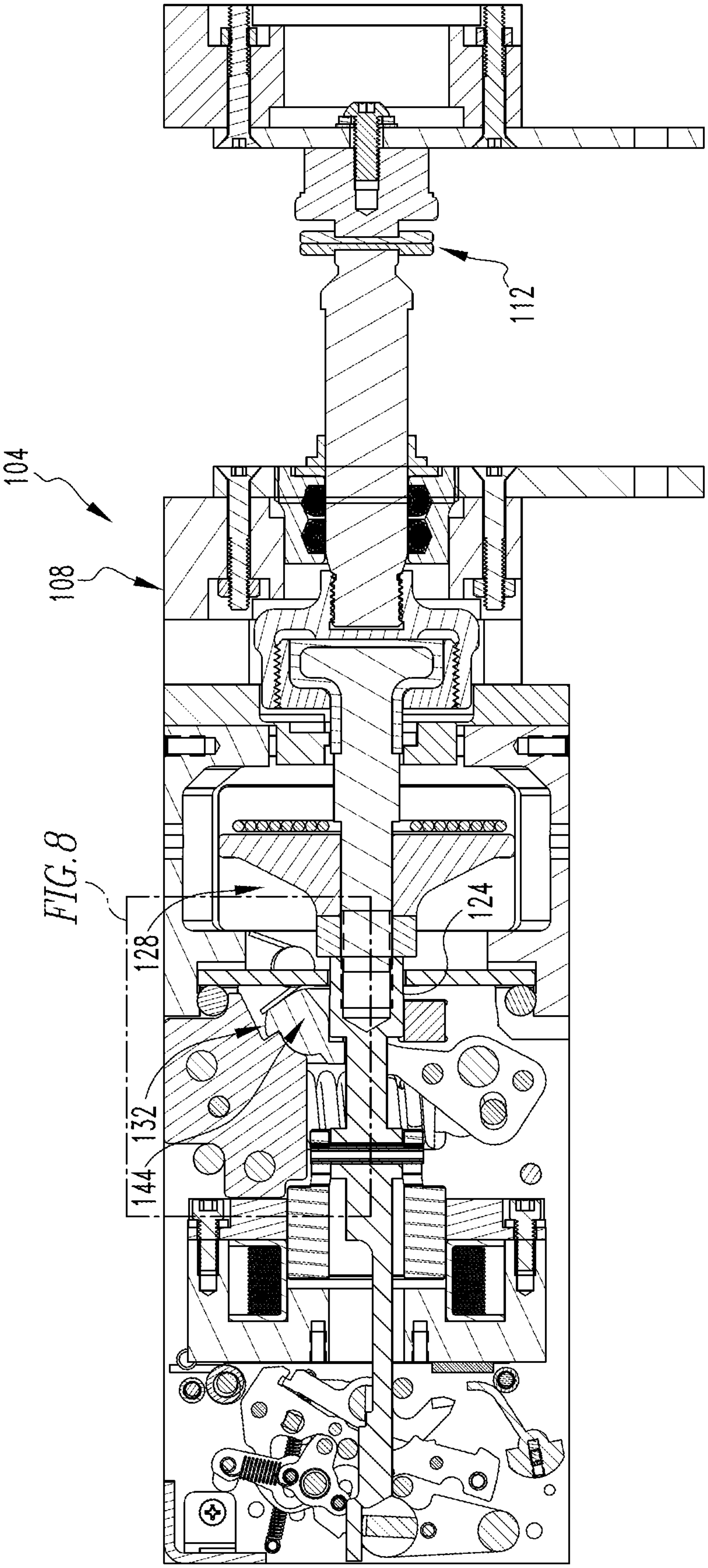
FIG. 7 is a side view of an improved circuit interrupter in accordance with a second embodiment of the disclosed and claimed concept.
Figure 8:
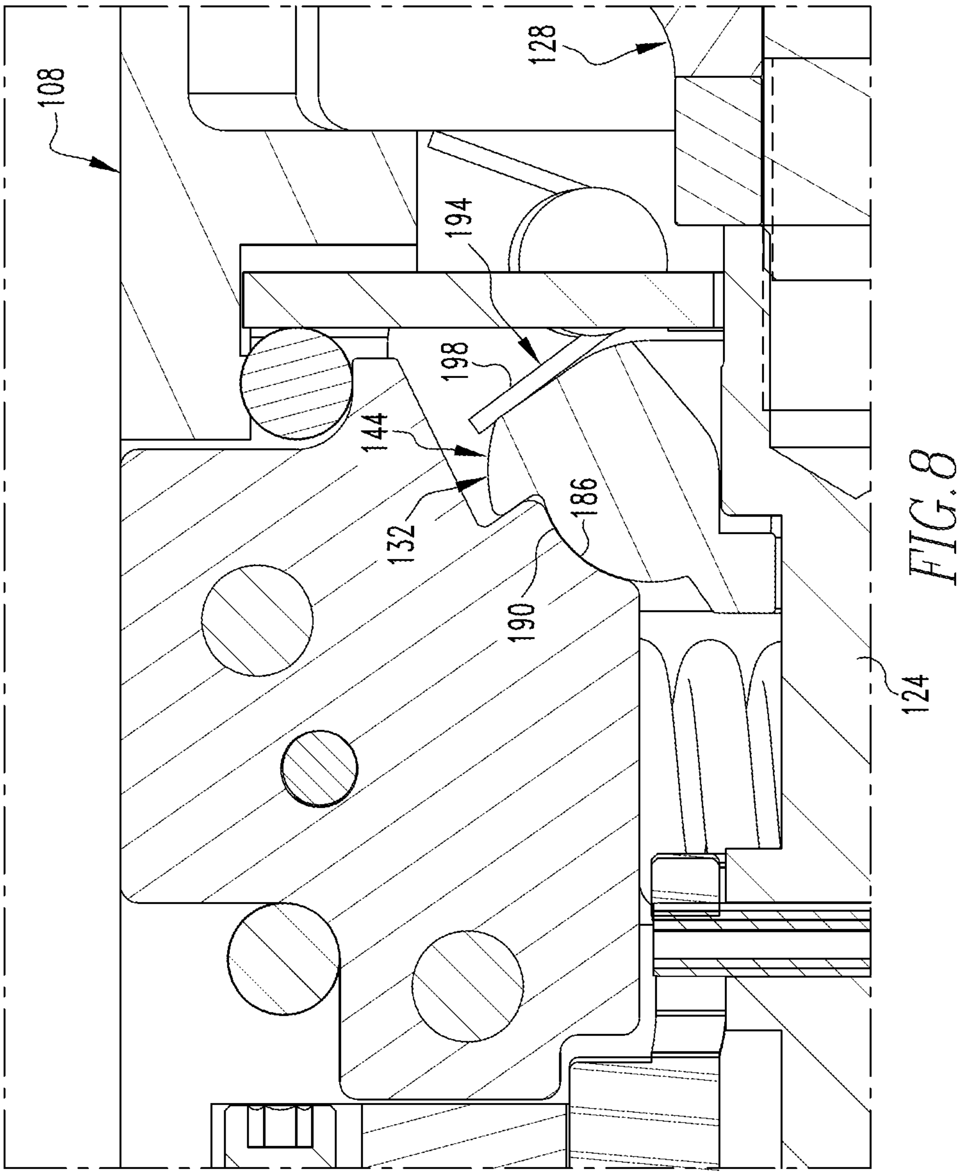
FIG. 8 is an enlargement of portion indicated in FIG. 7.

An improved circuit interrupter 104 in accordance with a second embodiment of the disclosed and claimed concept is depicted generally in FIGS. 7 and 8. The circuit interrupter 104 is similar to the circuit interrupter 4 by having a frame 108, a set of separable contacts 112, a shaft 124, a drive system 128, and a brake 132 that are similar to the structures of the circuit interrupter 4. It is noted, however, that the brake 132 includes a mass 144, and further includes a number of support arcuate surfaces 186 and a number of mass arcuate surfaces 190 that are frictionally cooperative with one another as a result of radial motion of the mass 144, to reduce the velocity of the shaft 124 as needed. That is, the brake 132 does not include a structure such as the another mass 56 of the circuit interrupter 4. The brake 132 further includes a biasing element 194 that is situated on the frame 108 and which includes a leg 198 that applies a biasing force to the mass 144.

It is understood that the drive system 128 of the circuit interrupter 104 translates the shaft 124 at various speeds and that the brake 132 advantageously reduces excess speed of the shaft 124. Such reduction in speed is a result of some pivoting of the mass 144 and also as a result of friction between the mass 144 and the frame 108 due to frictional engagement between the number of support arcuate surfaces 186 and the number of mass arcuate surfaces 190. Again, this is as a result of radial movement of the mass 144 that overcomes the biasing force of the biasing element 194.

It is understood, however, that other combinations of elements in accordance with the disclosed and claimed concept can be employed to sufficiently reduce the velocity of the shaft 24 and 124, as necessary, whenever an actuator such as a Thomson coil are employed to open, for instance, the set of separable contacts 12 and 112. Other variations will thus be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter comprising:

a frame;

a set of separable contacts comprising a stationary contact and a movable contact;

the stationary contact being affixed to the frame;

a shaft movably situated on the frame, the movable contact being situated on the shaft;

a drive system situated on the frame and operable to move the shaft with respect to the frame between a first position and a second position, the set of separable contacts being in a CLOSED state in the first position of the shaft and being in an OPEN state in the second position of the shaft; and a brake comprising a mass movably situated on the frame, the shaft being structured to engage the mass and to cause the mass to be in motion when moving from the first position toward the second position, wherein the drive system comprises a first actuator that is operable to move the shaft at a first velocity from the first position toward the predetermined position and engage the mass, and wherein the drive system comprises a second actuator that is operable to move the shaft at a second velocity greater than the first velocity from the first position toward the predetermined position and the engage the mass.

2. The circuit interrupter of claim 1 wherein the mass is pivotably situated on the frame, wherein the frame has a number of openings formed therein, and wherein the mass has a number of hubs that are pivotably situated in the number of openings with a clearance between the number of hubs and the number of openings that permit a radial movement of the mass in addition to a pivoting movement of the mass when the shaft engages the mass.

3. The circuit interrupter of claim 2 wherein the frame comprises a number of support arcuate surfaces, wherein the mass comprises a number of mass arcuate surfaces, and wherein movement of the shaft at the second velocity due to operation of second actuator results in the radial movement of the mass to be sufficient to cause the number of mass arcuate surfaces to engage the number of support arcuate surfaces and for the pivoting movement of the mass to result in friction between the mass and the frame.

4. The circuit interrupter of claim 2 wherein the frame comprises a number of support arcuate surfaces, wherein the mass comprises a number of mass arcuate surfaces, and wherein movement of the shaft at the first velocity due to operation of first actuator results in any radial movement of the mass to be insufficient to cause the number of mass arcuate surfaces to engage the number of support arcuate surfaces.

5. The circuit interrupter of claim 4 wherein the frame further comprises a biasing element that biases the number of hubs toward the number of openings.

6. A circuit interrupter comprising:

a frame;

a set of separable contacts comprising a stationary contact and a movable contact;

the stationary contact being affixed to the frame;

a shaft movably situated on the frame, the movable contact being situated on the shaft;

a drive system situated on the frame and operable to move the shaft with respect to the frame between a first position and a second position, the set of separable contacts being in a CLOSED state in the first position of the shaft and being in an OPEN state in the second position of the shaft; and a brake comprising a mass movably situated on the frame, the shaft being structured to engage the mass and to cause the mass to be in motion when moving from the first position toward the second position, wherein the brake further comprises another mass movably situated on the frame, the mass in motion being structured to engage the another mass and to cause the another mass to be in motion, wherein the mass in motion is structured to engage a first portion of the another mass to cause the another mass to be in motion, and wherein a second portion of the another mass in motion is structured to have a collision with the mass, wherein the mass has an arcuate surface, and wherein the second portion of the another mass has another arcuate surface, the arcuate surface and the another arcuate surface being structured to engage one another in the collision.

7. A circuit interrupter comprising:

a frame;

a set of separable contacts comprising a stationary contact and a movable contact;

the stationary contact being affixed to the frame;

a shaft movably situated on the frame, the movable contact being situated on the shaft;

a drive system situated on the frame and operable to move the shaft with respect to the frame between a first position and a second position, the set of separable contacts being in a CLOSED state in the first position of the shaft and being in an OPEN state in the second position of the shaft; and a brake comprising a mass movably situated on the frame, the shaft being structured to engage the mass and to cause the mass to be in motion when moving from the first position toward the second position, wherein the brake further comprises another mass movably situated on the frame, the mass in motion being structured to engage the another mass and to cause the another mass to be in motion, wherein the mass in motion is structured to engage a first portion of the another mass to cause the another mass to be in motion, and wherein a second portion of the another mass in motion is structured to have a collision with the mass, wherein the second portion of the another mass is structured to rebound from the mass responsive to the collision.

8. A circuit interrupter comprising:

a frame;

a set of separable contacts comprising a stationary contact and a movable contact;

the stationary contact being affixed to the frame;

a shaft movably situated on the frame, the movable contact being situated on the shaft;

a drive system situated on the frame and operable to move the shaft with respect to the frame between a first position and a second position, the set of separable contacts being in a CLOSED state in the first position of the shaft and being in an OPEN state in the second position of the shaft; and a brake comprising a mass movably situated on the frame, the shaft being structured to engage the mass and to cause the mass to be in motion when moving from the first position toward the second position, wherein the brake further comprises another mass movably situated on the frame, the mass in motion being structured to engage the another mass and to cause the another mass to be in motion, wherein the mass in motion is structured to engage a first portion of the another mass to cause the another mass to be in motion, and wherein a second portion of the another mass in motion is structured to have a collision with the mass, wherein the mass and the another mass are each pivotably situated on the frame.

* * * * *